United States Patent
Best et al.

[11] Patent Number: 6,003,658
[45] Date of Patent: Dec. 21, 1999

[54] TELESCOPING RIGID FRAME AND SCISSOR CONVEYOR WITH SUSPENSION

[75] Inventors: John W. Best; Bob K. Flippo; James D. Walker; Gary D. Carter, all of Jonesboro, Ark.

[73] Assignee: Northstar Industries, Inc., Jonesboro, Ark.

[21] Appl. No.: 08/456,251

[22] Filed: May 31, 1995

Related U.S. Application Data

[63] Continuation-in-part of application No. 08/349,268, Dec. 5, 1994, Pat. No. 5,490,592.

[51] Int. Cl.$^6$ .................................................. B65G 15/26
[52] U.S. Cl. ...................................... 198/588; 193/35 TE
[58] Field of Search ................................... 198/588, 812; 193/35 TE

[56] References Cited

U.S. PATENT DOCUMENTS

| | | | |
|---|---|---|---|
| 2,576,217 | 11/1951 | Eggleston | 198/812 X |
| 2,760,617 | 8/1956 | Bowen | 193/35 TE |
| 2,815,849 | 12/1957 | Zumbrunnen . | |
| 2,826,290 | 3/1958 | Barski . | |
| 3,068,983 | 12/1962 | McLaughlin | 193/35 TE |
| 3,225,879 | 12/1965 | Falcon et al. | 193/35 TE |
| 3,294,216 | 12/1966 | Girardi . | |
| 3,596,785 | 8/1971 | Weatherford, Jr. . | |
| 4,260,053 | 4/1981 | Onodera | 198/812 |
| 4,852,712 | 8/1989 | Best | 193/35 TE |
| 5,224,584 | 7/1993 | Best et al. | 198/782 |

FOREIGN PATENT DOCUMENTS

| | | |
|---|---|---|
| 0372130 | 5/1973 | U.S.S.R. . |
| 1407861 | 7/1988 | U.S.S.R. . |

*Primary Examiner*—James R. Bidwell
*Attorney, Agent, or Firm*—James L. Ewing, IV; Kilpatrick Stockton LLP

[57] ABSTRACT

Telescoping rigid frame/scissor conveyors with suspension structures to accommodate less than totally flat surfaces, and for easy and ergonomic repositioning. Such conveyors are formed of a plurality of telescoping frame segments which may be positioned at any number of desired nested/unnested configurations. The frame segments bear a lazy tong or scissors conveyor structure which assures uniform roller spacing, and rollers positioned at one height along the conveyor rather than at different heights for each frame segment. The conveyors are adapted to bear greater weight than conventional lazy tongs conveyors, but contain suspension systems in order to conform to irregularities in factory and warehouse floors and slabs and for easy movement. The suspension systems may include motorized drive units, swivel mounted roller units, jacking roller units and more conventional rigid legs that contain springs or other suspension members to distribute the loads of and borne by the conveyors evenly and efficiently, and to allow the conveyors to positioned, expanded and retracted easily and efficiently.

21 Claims, 6 Drawing Sheets

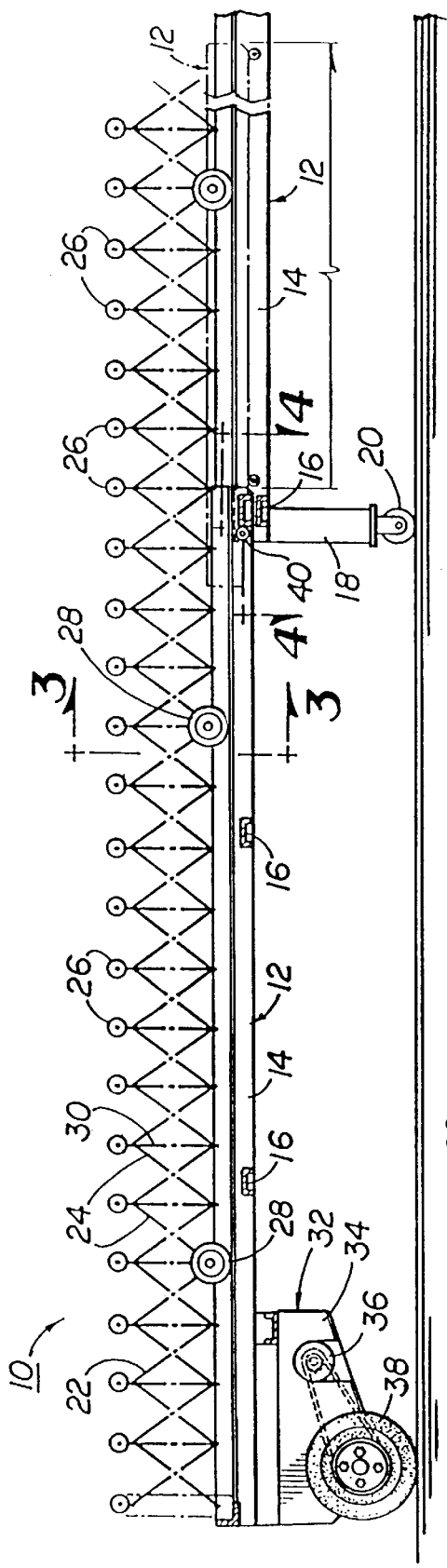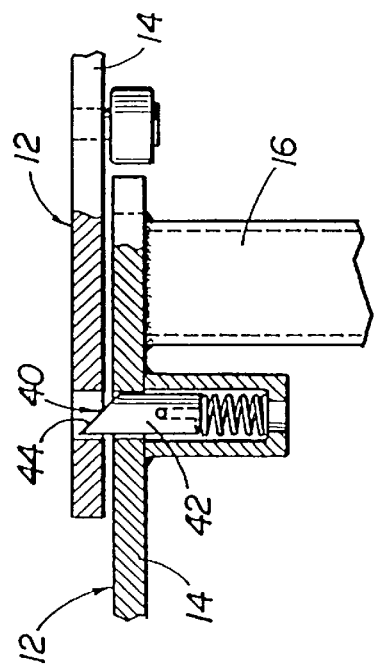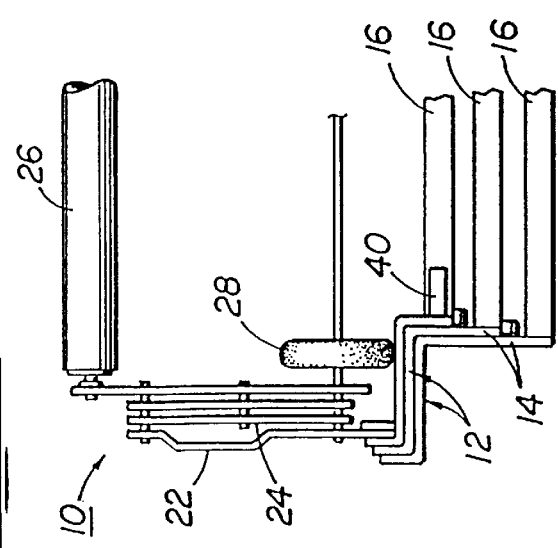

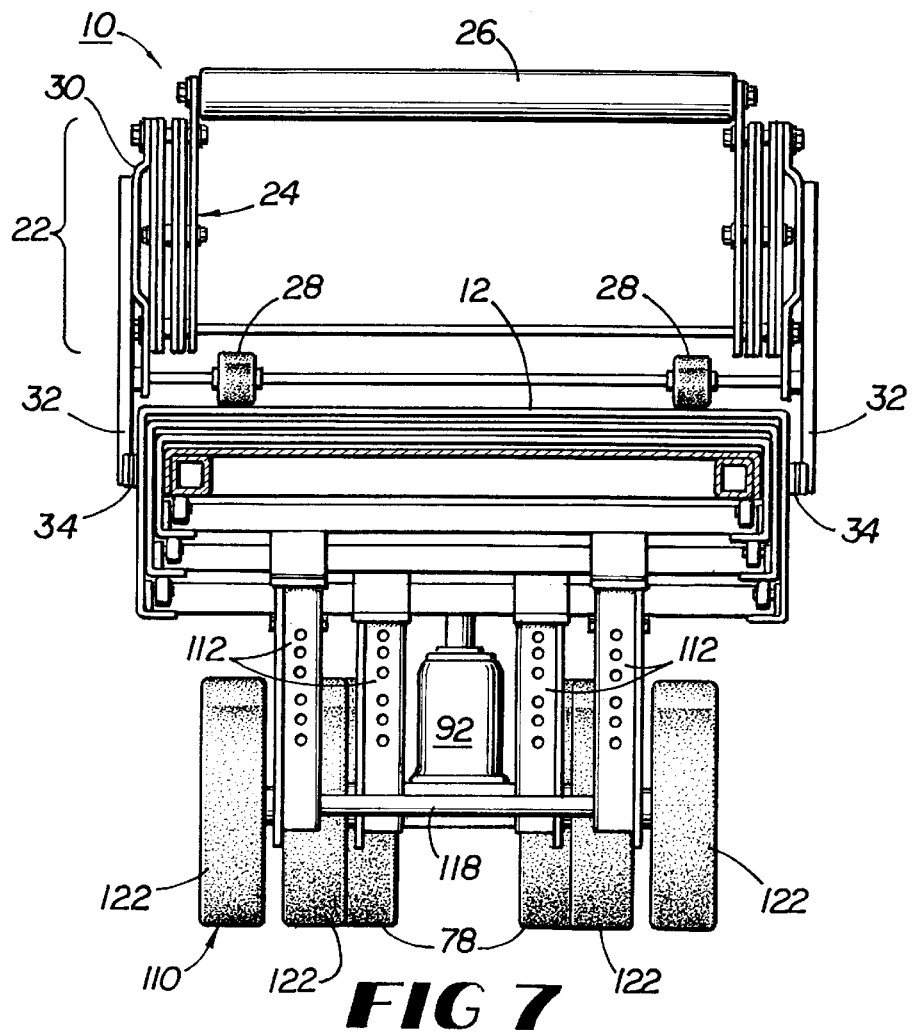
FIG 7
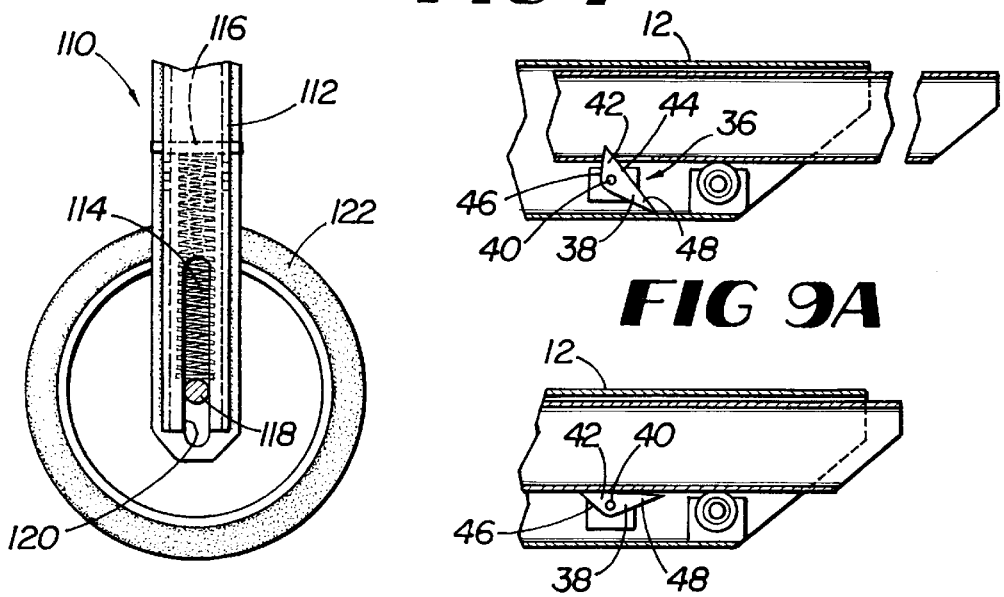
FIG 8  FIG 9A  FIG 9B

TELESCOPING RIGID FRAME AND SCISSOR CONVEYOR WITH SUSPENSION

This document is a continuation in part of U.S. Ser. No. 08/349,268 filed Dec. 5, 1994 entitled "Telescoping Rigid Frame and Scissor Conveyor" now U.S. Pat. No. 5,490,592 issued Feb. 13, 1996.

The present invention relates to conveyors which include a telescoping rigid frame structure which supports a lazy tong conveyor structure and which feature unique suspension systems. The structures are adapted to bear heavy loads without sacrificing flexibility in accommodating various desired lengths, various floor heights and irregularities, and while maintaining uniform roller separation and height.

BACKGROUND OF THE INVENTION

Roller conveyors, whether rigid frame or of lazy tong structure, are conventional. For instance, U.S. Pat. No. 4,852,712 issued Aug. 1, 1989 to Best entitled "Conveyor" discloses an extensible lazy tong conveyor. U.S. Pat. No. 5,224,584 issued Jul. 6, 1993 to Best, et al. entitled "Expandable Powered Conveyors" discloses power conveyors in which the power units are located external to the rollers and connected to them via a number of chains or belts. U.S. patent application Ser. No. 08/022,012 to Best, et al. filed Feb. 24, 1993 entitled "Controllably Powered Roller Conveyors" discloses powered lazy tong conveyors in which the power units are located within the rollers. All of these patent documents are incorporated by this reference.

Additionally, various forms of rigid frame roller and skate wheel conveyors have been used for many years for various purposes. In the past, however, in the event a rigid frame conveyor needed to be extensible, the rollers in one frame segment which could telescope into another frame segment must be positioned at a different height than the rollers in adjacent segments, in order for nesting to be possible. Such variations in height may cause conveyor jams as articles such as boxes drop from one segment to another and their corners become lodged between rollers. Accordingly, conventional resolution has been to include non-roller transitions in the form of short ramps which allow the articles on the conveyor to slide from one level of roller to another level of roller on another segment. Even measures such as this cannot avoid jamming ultimately, however, because the distance between the end of the ramp and the rollers on the lower level is variable and prone to catching box corners.

Additionally, recent ergonomic requirements, occupational health and safety requirements, and greater concern for the welfare of workers have created the need for expandable conveyors to operate in a powered, automatic and easily controllable fashion. Not only must the conveyor contain reliable power means for causing it to extend and retract, but it must also include limit and delimit switches in order to avoid overextension and for safety concerns.

Recent experience has also shown that movable and/or repositionable telescoping rigid/flexible conveyors such as those disclosed in U.S. Ser. No. 08/349,268 referenced above, will be employed in environments where the floors are not completely flat. Changes in height due to concrete pouring anomalies, for instances, or differences between slab height, can create a need for telescoping rigid/flexible conveyors to conform and accommodate other than perfectly flat surfaces in order to be moved easily and to distribute efficiently and effectively the loads imposed by the articles being conveyed.

Additionally, such telescoping rigid/flexible conveyors do occupy more space, even when fully retracted, and do weigh considerably more, because of their rigid telescoping frames, than conventional scissors or lazy tong conveyors. Accordingly, it becomes increasingly advantageous to include structures and mechanisms in such conveyors for allowing them to be easily, efficiently and ergonomically moved and repositioned.

SUMMARY OF THE INVENTION

The present invention provides suspension systems and other systems for allowing telescoping rigid/flexible conveyors to accommodate less than perfectly flat surfaces while remaining easy to reposition and while bearing and distributing heavy loads of the type previously accommodated only by rigid frame conveyors, but at the same time maintaining the rollers at a constant height and constant spacing for more reliable and less jamming-prone conveyance of articles (among other purposes). The structures may include a number of rigid frame segments formed preferably of channels or in monocoque fashion and positioned upon suspension members that ride on casters or rollers. The segments telescope with respect to one another as, for example, they or their channels telescope into one another. The segments also bear rollers which support an expandable lazy tong conveyor structure which thus rides atop the telescoping frame segments. Although this conveyor structure appears at first blush to be inordinantly complex, duplicative and redundant, it has been found that the additional considerable advantages brought about by consistent height rollers which are also disposed at consistent distances from one another by virtue of the lazy tong structure, more than outweigh any structural complexity.

Suspension systems according to the present invention may include motorized drive units, all or a portion of which are suspended relative to the conveyor frame segments, swivel roller units which contain wheels that are mounted to swivel with respect to the conveyor, new jack roller units which may be actuated to lift other conveyor wheels from the floor for easy repositioning of the conveyor, and rigid leg units which contain springs that bear the weight of the conveyor.

Other features include sliding retainers which may be connected to the lazy tong structures in a manner so as to slide relative to the frame segments and thus retain the lazy tong structures atop the frame segments. New locking mechanisms automatically preclude overextension of the frame segments relative to one another, without requiring manual intervention.

It is accordingly an object of the present invention to provide an expandable conveyor for bearing heavy loads but which maintains the rollers at a uniform height and distance relative to one another via a lazy tong structure, and which accommodates irregularities in floor height and shape.

It is an additional object of the present invention to provide expandable conveyors which may be automatically extended and retracted with respect to one another, and which may be easily moved from side to side and repositioned.

It is an additional object of the present invention to provide expandable conveyors featuring a number of suspension units which allow the conveyors to distribute weight of and borne by conveyors easily and efficiently, but in a manner so that the conveyor can be easily repositioned.

It is another object of the present invention to provide conveyors which contain automatic locks for reducing the changes of overextension.

Other objects, features and advantages of the present invention will become apparent with respect to the remainder of this document.

BRIEF DESCRIPTION OF THE DRAWINGS

FIG. 2 is a cross-sectional view, schematic, of conveyors of FIG. 1.

FIG. 3 is a cross-sectional view of Section 3/3 of FIG. 2.

FIG. 4 is a cross-sectional view of Section 4/4 of FIG. 2.

FIG. 7 is a cross sectional view of a portion of the conveyor of FIG. 5.

FIG. 8 is a side elevational partial cross sectional view of a portion of a fixed length support unit of the conveyor of FIG. 5.

FIG. 9A is a side elevational view of a locking mechanism of the conveyor of FIG. 5 in locking position.

FIG. 9B is a side elevational view of a locking mechanism of the conveyor of FIG. 5 in unlocked position.

DETAILED DESCRIPTION OF THE DRAWINGS

Figure 1:
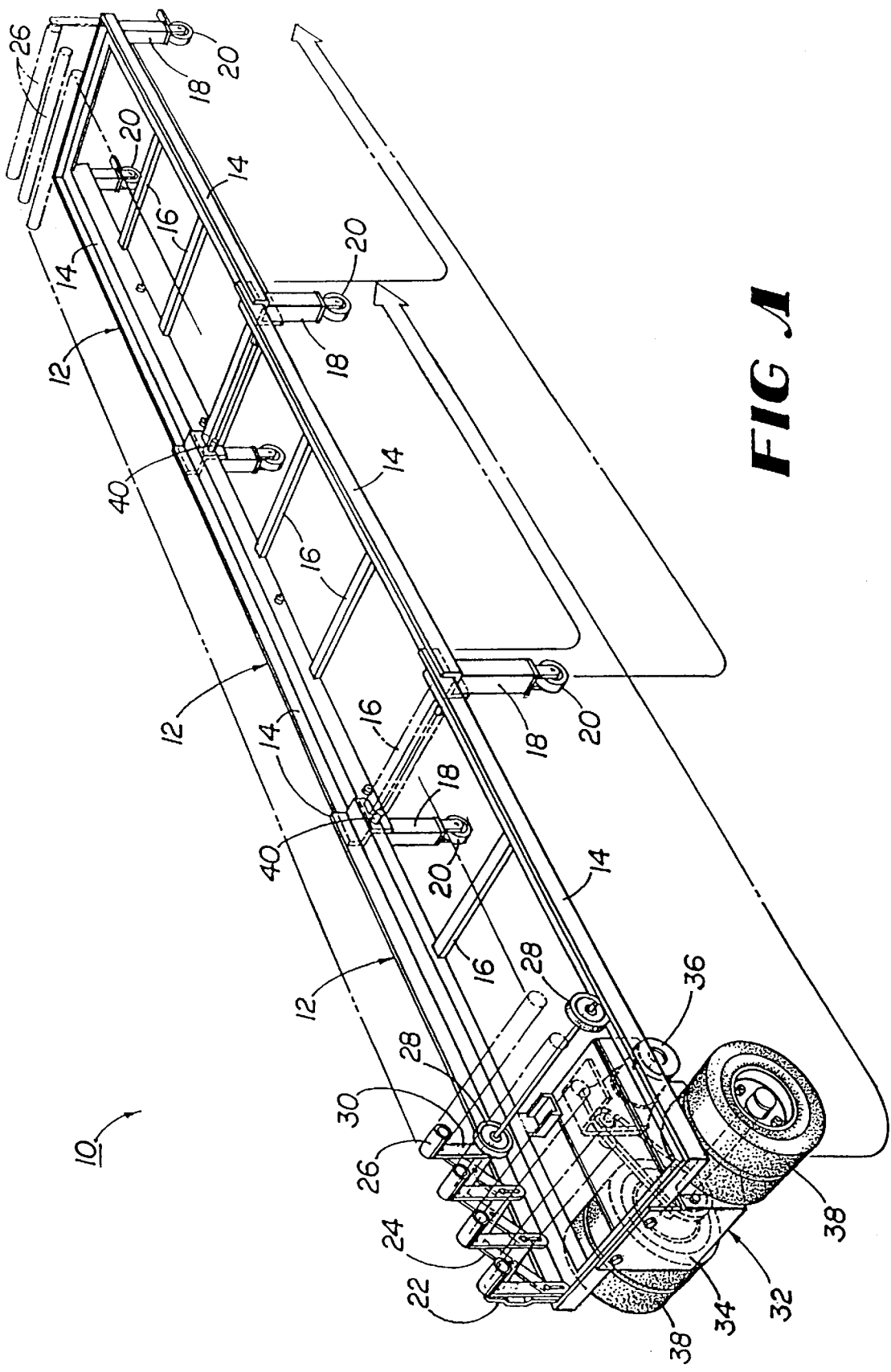
FIG. 1 is a perspective view of a first embodiment of conveyors according to the present invention.

FIGS. 1–4 show a first embodiment of conveyor 10 according to the present invention. Conveyor 10 includes a number of frame segments 12 which are adapted to telescope or nest relative to one another. As an example, as shown in FIG. 1, each frame segment includes a pair of channels 14 such as Z-channels or L-channels which are connected to each other via braces or other linking members of desired length in order to form a desired width of conveyor. The channels 14 and/or linking members 16 connect to at least one pair of support legs 18 which may be formed of desired channel or other structural material and extend substantially vertically from the channel 14/linking member 16 web. Each support leg 18 is connected to at least one suitable roller or caster 20, which may be conventional and may contain a brake.

Channels 14 of successive frame segments 12 are disposed, as by linking members 16, to allow channels 14 of one frame segment 12 to nest within channels 14 of an adjacent frame segment 12. This relationship is shown in FIGS. 1 and 3. Accordingly, the frame segments 12 may be nested or telescoped into one another according to any desired scheme, such as to allow then to be nested substantially completely (although complete nesting is not a requirement, and the structure need not be formed to allow substantially complete nesting).

Positioned atop frame supports 12 is a lazy tong conveyor structure 22. The conveyor structure 22 is formed in conventional lazy tong conveyor structure fashion as by scissor members 24, most of which are connected at their top, mid-segment and bottom portions to other scissor members 24 via bolts, rivets or any other desired fastener. The top connections may be formed of axles for rollers 26 as disclosed in the above-referenced patents, or as otherwise desired. At least some of the bottom connections, or other portions of the lazy tong conveyor structure 22 are connected to tracking wheels 28 which support the lazy tong conveyor structure 22 and ride in the panels 14 of the frame segments 12. The lazy tong conveyor structure 22 may contain vertical members 30 which support rollers 26 and/or tracking wheels 28 and which provide greater strength in the structure. The lazy tong structure 22 accordingly is adapted to extend and retract coextensively with nesting and unnesting of frame segments 12. Beneficially, the expansion and retraction of the lazy tong conveyor structure 22 always accommodates uniform spacing of the rollers 26, and they are maintained at a single level. These characteristics are distinguishable from earlier conveyors, in which rollers connected more directly to frame segments 12 would need to be positioned at different heights for nesting to occur and, in any event, would be spaced other than uniformly as discontinuities occur between one segment and the next.

One or more frame segments 12 may contain a motive unit 32 for assisting in nesting and unnesting. Motive unit 32 includes a frame 34 which carries a motor 36 of desired power and size requirements. The motor 36 is connected to one or more wheels 38, as by chain or drive belt as conventionally desired in order to couple motor 36 to wheels 38. Motor 36 is controlled by a controller circuit which responds to limits which is as required for preventing overextension of frame segments 12, and which allows automatic, reliable and intuitive nesting and unnesting of conveyor 10.

One or more frame segments 12 may also contain a lock 40 for preventing overextension of frame segments 12 relative to one another and undesired movements during use. The locks 40 may be, for example, as shown in FIG. 4 in which a spring loaded lug 42 with beveled extremity 44 slides into an opening in an adjacent frame roller channel for the locking position in order to prevent overextension. However, when nesting is required, the frame segment pushes in the opposite direction against the beveled extremity 44 to force the lug 42 into its retracted position. Multiple openings may obviously be employed in the cooperating frame segment 12 as desired for accommodating predetermined lengths of conveyor; alternatively, the locks may be used simply for preventing overextension beyond a point at which the frame segments 12 would lose structural cooperation.

Rollers 26 may be powered internally or externally as disclosed in the above-referenced U.S. patent documents. They may be powered by any other desirable means as well.

FIGS. 5–10 show a second embodiment of conveyors 10 according to the present invention. Frame segments 12 in this embodiment are made in monocoque fashion instead of being composed of channels 14. That is, frame segments 12 are generally integral, steel or alloy plates or sheets wrapped to form a generally c-shaped channel as shown, for instance, in FIG. 7. The monocoque structure provides greater rigidity with less weight, is more easily manufactured, and is better adapted to resist and withstand torsional forces often imposed on the conveyor 10. However, frame segments 12 as in the first embodiment mentioned above may be used, as may be any other desirable structure.

As in the first embodiment discussed above, lazy tong structure 22 is supported by the frame segments 12, which structure may be formed of scissor members 24, rollers 26, tracking wheels 28 and vertical members 30 as described above. In addition, retaining members 32 may be attached to the vertical members 30 for ensuring that lazy tong structure 22 remains substantially centered atop frame segments 12. Retaining members 32 preferably comprise steel or aluminum bars which may be bolted or welded to vertical members 30 (or otherwise attached to lazy tong structures 22 as desired). They preferably feature shows 34 which are fitted with suitable plastomeric or other bearing surfaces to allow retaining members 32 to slide relative to frame segments 12 as lazy tong structures 22 expand/contract and frame segments 12 telescope.

Frame segments 12 may also be prevented from over-telescoping or extending relative to one another via new lock mechanisms 36 as shown in FIGS. 9A and 9B. As shown there, an elongated lock 38 is pivotally mounted at its pivot section 40 to a first frame segment 12 such as by a pin or bolt. Located adjacent to one extremity of the lock 38 is a stop/rider section 42. That section comprises a first, rider surface 44 which is adapted to slide relative to another, adjacent frame segment 12, and a second, stop surface 46 which is adapted to bear against a portion of the adjacent frame segment 12 when the rider surface 44 is not sliding against it (such as when adjacent frame segment 12 has been extended almost into fully telescoped position and a slot in the adjacent frame segment has accordingly been slid into position over the lock 38). A weight section 48 may be used to rotate stop surface 46 into place, by falling downward when the slot of the adjacent frame segment 12 moves over the lock 38 so that rider surface 44 is no longer biased downward. When the adjacent frame segment 12 is retracted, a wall of the slot bears against rider surface 44 to push it back into sliding relationship and lock 38 back into non-locking position. Instead of weight section 48, a spring or any other desirable structure may be employed.

Figure 5:
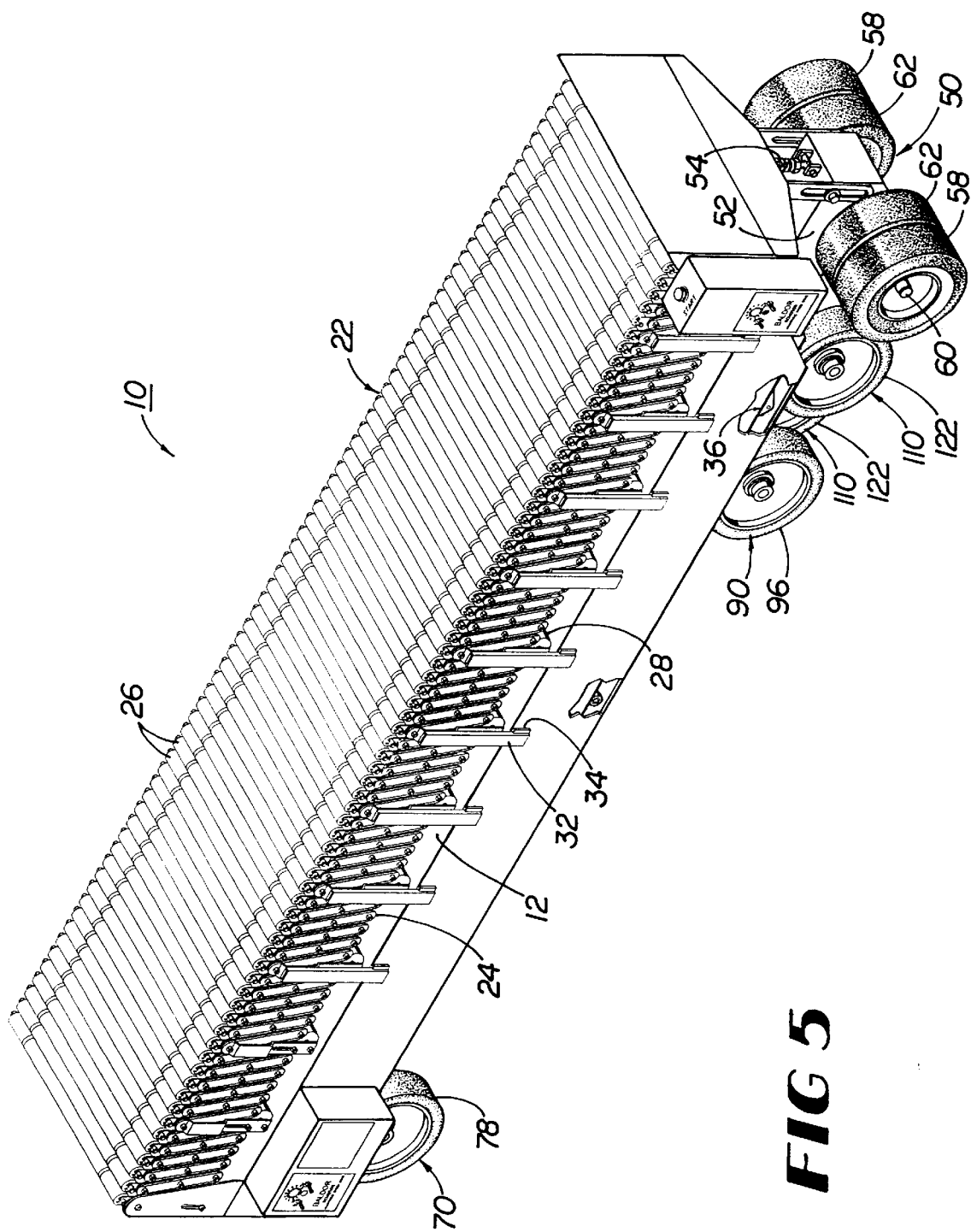
FIG. 5 is a perspective view of a second embodiment of conveyors according to the present invention.

FIGS. 5, 6, 8 and 10 show more fully the suspension systems according to the present invention. As shown in FIG. 5, they may include a drive roller unit 50, a swivel roller unit 70, a new jack unit 90, and fixed length support units 110. Various combinations of these may be employed to allow conveyors 10 to be easily repositionable, to accommodate variations in floor or slab surfaces, and to distribute weight of conveyors and their loads efficiently and evenly.

Figure 6:
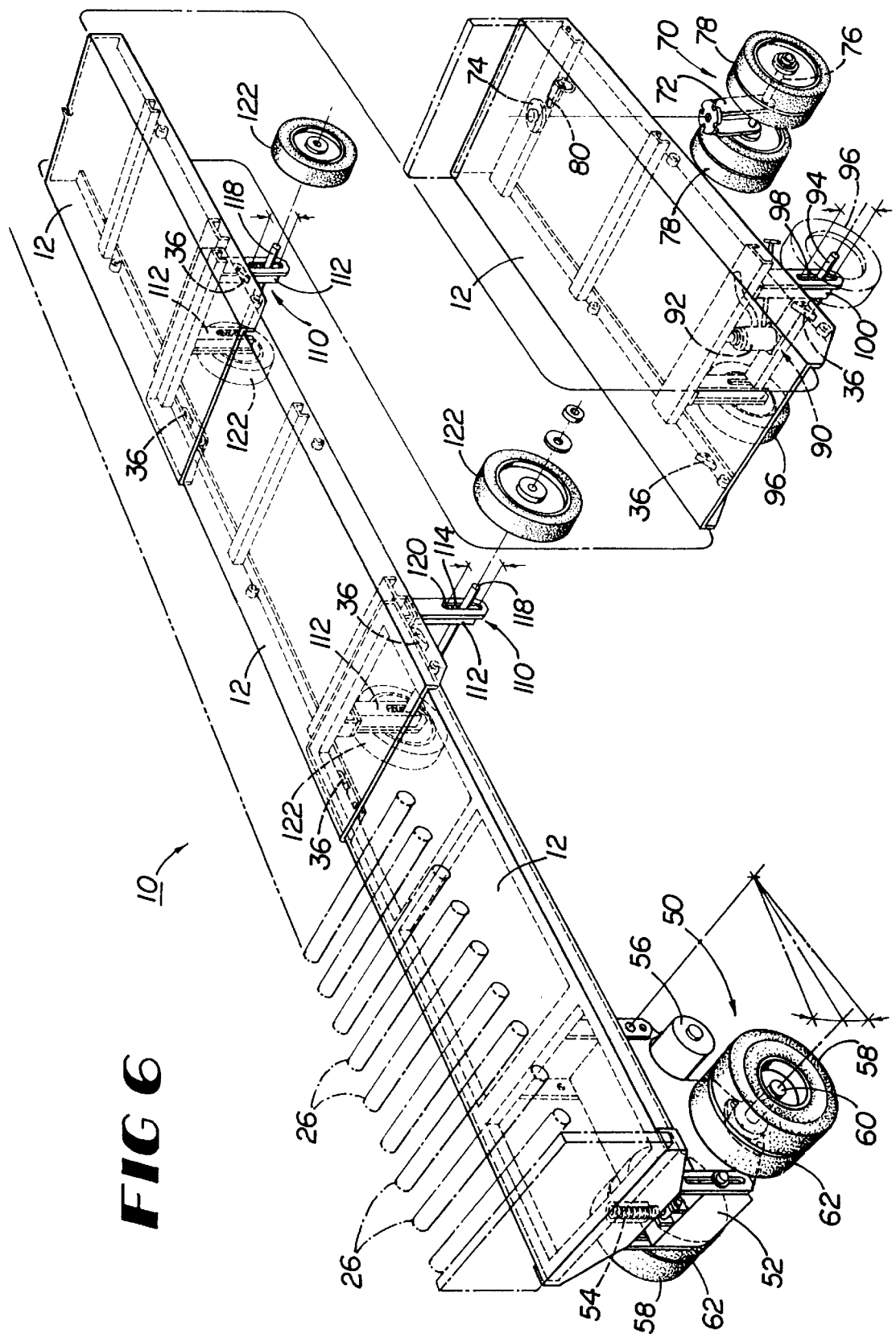
FIG. 6 is a partially exploded view of the conveyor of FIG. 5.
Figure 10:
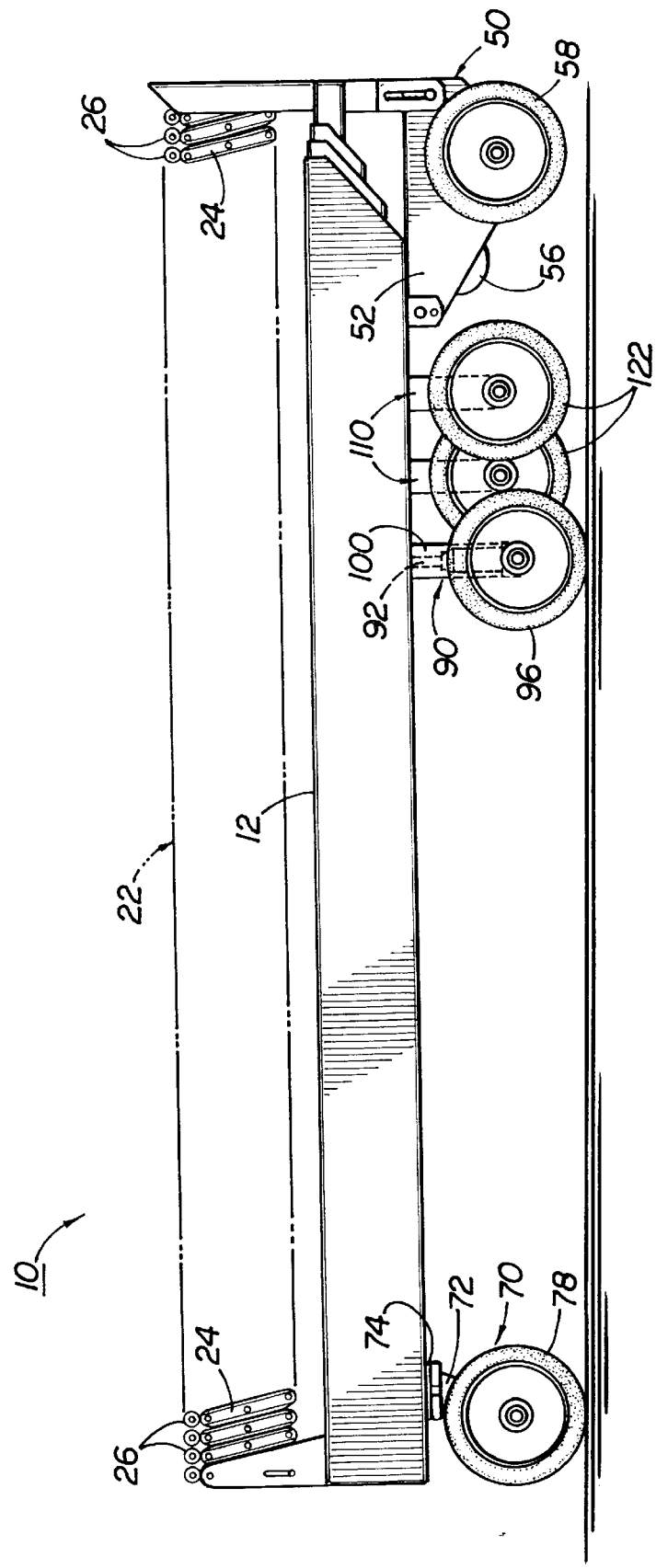
FIG. 10 is cross sectional view of the conveyor of FIG. 5 with the new jack mechanism actuated to raise certain wheels of the conveyor from the floor for moving and repositioning the conveyor easily and conveniently.

Drive roller unit 50 as shown in FIGS. 5 and 6 comprises a drive roller unit frame 52 which is preferably pivotally mounted at one end, either directly or indirectly as by additional structure to a frame segment 12. The other end of the frame 52 bears against at least one spring 54 which thus suspends the conveyor 10 on frame 52 and unit 50. A motor 56 of conventional design and with conventional control circuitry is mounted or connected to frame 52 and connected to at least one drive wheel 58. At least one axle 60 may be connected to frame 52 and mount drive wheel 58 and other wheels 62 as desired.

Swivel roller unit 70 comprises a frame 72 which is preferably mounted to frame segment 12 by a swivel plate or bearing 74 of conventional design. An axle 76 received in the frame 72 mounts a pair of wheels 78 so that the wheels 78 may swivel relative to the frame segment 12. A locking pin 80 as shown in FIG. 6, or other suitable locking mechanism may be employed to lock rotation or swivel action of wheels 78 relative to frame segments 12.

New jack unit 90 may used to lift other wheels off the ground, such as drive unit wheels and/or fixed length support unit wheels, so that the conveyor 10 may be easily rolled into or out of place, or otherwise repositioned as desired. New jack unit 90 may comprise a hydraulic or other jack 92 which bears against a frame segment 12 and, directly or indirectly against an axle 94 that supports new jack unit wheels 96. When jack 92 is not actuated, the axle 94 may ride on springs 98 which are contained in leg structures 100. Leg structures may be conventional leg structures which are adapted with slots to receive axle 94 in sliding fashion as springs 98 accept the load. When jack 92 is actuated, as shown for instance in the preferred embodiment in FIG. 10, drive unit 50 wheels 58 and 62 are raised from the floor as are fixed length support unit 110 wheels so that the new jack unit 90 wheels 96 and swivel roller unit 70 wheels 78 bear the conveyor for easy movement.

FIG. 8 shows in greater detail the structure of fixed length support units 110 (and, if desired, sections of new jack units 90). A pair of leg members 112, which may generally be of conventional structure, are attached to a frame segment 12. Each contains a spring 114 which bears against a pillow block 116 in the leg members 112 and against an axle 118 slidably received in slots 120 formed in the leg members 12. The axle bears, preferably, at least a pair of wheels 122.

The foregoing structures may be formed and fashioned from conventional materials employed for making conveyors. Springs of various sizes and with various spring constants may employed depending on the size and configuration of the conveyor. In the preferred embodiment, the springs are Blue Die Springs supplied by Jonesboro Bolt and Supply, Inc., Jonesboro, Ark. The jack is an "Indy 5" 4 ton bottle jack model 470HJ4 supplied by Allied Automotive/Allied International, Sylmar, Calif. 91342 (min height 7⅝"; max height 14⅝"). Wheels may be of pneumatic, semi-pneumatic, solid or as otherwise desired.

The foregoing has been provided for purposes of illustration and explanation of a preferred embodiment according to the present invention. Other structures, modifications of the disclosed structure, and derivative structures may be prepared and used without departing from the scope or spirit of the present invention.

What is claimed is:

1. An expandable conveyor, comprising:
   a. A plurality of frame segments, each adapted to nest within other frame segments to form a telescoping at least quasi-rigid structure;
   b. a lazy tongs conveyor structure disposed on the frame segments, comprising:
      (1) a pair of expandable lazy tong structures, each connected to a plurality of rollers adapted to be received by the channels of the frame segments so that each lazy tong structure rides atop a frame segment; and
      (2) a plurality of conveyor rollers, each connecting an upper connection in a lazy tong structure to a corresponding upper connection in the other lazy tong structure in the pair;
   c. the lazy tongs conveyor structure adapted to ride atop the frame structure in order to expand as the frame segments are unnested and contract as the frame segments are nested, but at any desired length of the conveyor, to function as an expandable roller conveyor; and;
   d. a plurality of fixed length support units, each connected to a frame segment, and each comprising:
      (1) at least one leg which in turn comprises a rigid portion to which a spring is connected;
      (2) an axle upon which the spring rides; and
      (3) at least one wheel connected to the axle.

2. A conveyor according to claim 1 further comprising a drive unit, which drive unit comprises:
   a. a drive unit frame connected to one of the frame segments;
   b. an axle received in the drive unit frame, which axle is connected to at least a pair of wheels, at least one of which is a drive wheel;
   c. a motor connected to the drive unit frame and connected to the drive wheel; and d. at least one spring adapted and positioned to transmit at least part of a load imposed on the conveyor to the wheels of the drive unit.

3. A conveyor according to claim 2 in which the drive unit frame is connected in the vicinity of one extremity to the frame segment in hinged fashion and in the vicinity of another extremity to the frame segment via the spring.

4. A conveyor according to claim 1 further comprising a swivel roller unit connected to one of the frame segments, the roller unit comprising a swivel roller unit frame rotatably connected to the frame segment, and at least one pair of wheels connected to the swivel roller unit via at least one axle.

5. A conveyor according to claim 4 in which the swivel roller unit is connected to the frame segment via a swivel plate.

6. A conveyor according to claim 4 in which the swivel roller unit contains a locking structure to lock rotation of the swivel roller unit relative to the frame segment.

7. A conveyor according to claim 1 further comprising a jacking roller unit comprising:
   a. at least one leg connected to a frame segment and adapted to receive an axle in sliding fashion;
   b. an axle spanning the legs and connected to at least a pair of wheels; and
   c. a jack connected to the frame segment and the axle, which jack is adapted to be actuated in order to bear the weight of the conveyor when desired, so that other wheels of the conveyor are raised from the surface bearing the conveyor.

8. A conveyor according to claim 7 in which the legs each comprise a rigid portion to which a spring is connected, and the springs are adapted to bear the weight of the conveyor.

9. A conveyor according to claim 1 further comprising at least one sliding retainer connected to the lazy tongs conveyor structure and adapted to slide with respect to at least one frame segment in order to retain the lazy tongs structure atop the frame segment.

10. A conveyor structure comprising:
    a. a plurality of rigid telescoping frame segments;
    b. a lazy tongs structure that includes a plurality of rollers, positioned atop the telescoping frame segments and adapted to expand and retract as the frame segments are telescoped;
    c. a drive unit connected to at least one of the rigid telescoping frame segments, comprising:
       (1) a drive unit frame connected to one of the frame segments;
       (2) an axle received in the drive unit frame, which axle is connected to at least a pair of wheels, at least one of which is a drive wheel;
       (3) a motor connected to the drive unit frame and connected to the drive wheel; and
       (4) at least one spring adapted and positioned to transmit at least part of a load imposed on the conveyor to the wheels of the drive unit.

11. A conveyor according to claim 10 in which the drive unit frame is connected in the vicinity of one extremity to the frame segment in hinged fashion and in the vicinity of another extremity to the frame segment via the spring.

12. A conveyor according to claim 10 further comprising a swivel roller unit connected to one of the frame segments, the roller unit comprising a swivel roller unit frame rotatably connected to the frame segment, and at least one pair of wheels connected to the swivel roller unit frame via at least one axle.

13. A conveyor according to claim 12 in which the swivel roller unit frame is connected to the frame segment via a swivel plate.

14. A conveyor according to claim 12 in which the swivel roller unit contains a locking structure to lock rotation of the swivel roller frame unit relative to the frame segment.

15. A conveyor according to claim 10 further comprising a jacking roller unit comprising:
    a. at least one leeg connected to a frame segment and adapted to receive an axle in sliding fashion;
    b. an axle spanning the legs and connected to at least a pair of wheels; and
    c. a jack connected to the frame segment and the axle, which jack is adapted to be actuated in order to other the weight of the conveyor when desired, so that other wheels of the conveyor are raised from the surface bearing the conveyor.

16. A conveyor according to claim 15 in which the legs each comprise a rigid portion to which a spring is connected, and the springs are adapted to bear the weight of the conveyor.

17. A conveyor according to claim 10 further comprising a plurality of fixed length support units, each connected to a frame segment, and each comprising at least one leg which in turn comprises a rigid portion to which a spring is connected, an axle upon which the spring rides; and at least one wheel connected to the axle.

18. An expandable conveyor, comprising:
    a. A plurality of frame segments, each adapted to nest within other frame segments to form a telescoping at least quasi-rigid structure;
    b. a lazy tongs conveyor structure disposed on the frame segments, comprising:
       (1) a pair of expandable lazy tong structures, each connected to a plurality of rollers adapted to be received by the channels of the frame segments so that each lazy tong structure rides atop a frame segment; and
       (2) a plurality of conveyor rollers, each connecting an upper connection in a lazy tong structure to a corresponding upper connection in the other lazy tong structure in the pair;
    c. the lazy tongs conveyor structure adapted to ride atop the frame structure in order to expand as the frame segments are unnested and contract as the frame segments are nested, but at any desired length of the conveyor, to function as an expandable roller conveyor; and
    d. a plurality of suspension units, comprising at least one drive unit that includes a motor and at least one drive wheel, and at least one swivel unit that includes at least one pair of wheels rotatably connected via a swivel unit frame to a frame segment.

19. A conveyor according to claim 18 further comprising a jacking unit comprising a jack connected to an axis upon which a pair of wheels is mounted, and to a frame segment, which jack is adapted to be actuated in order to lift other wheels of the conveyor from the surface that supports the conveyor.

20. An expandable conveyor, comprising:
    A plurality of frame segments, each adapted to nest within other frame segments to form a telescoping at least quasi-rigid structure;
    A lazy tongs conveyor structure disposed on the frame segments, comprising:
       a pair of expandable lazy tong structures, each connected to a plurality of rollers adapted to be received by the channels of the frame segments so that each lazy tong structure rides atop a frame segment; and a plurality of conveyor rollers, each connecting an upper connection in a lazy tong structure to a corresponding upper connection in the other lazy tong structure in the pair;

The lazy tongs conveyor structure adapted to ride atop the frame structure in order to expand as the frame segments are unnested and contract as the frame segments are nested, but at any desired length of the conveyor, to function as an expandable roller conveyor; and At least one extension lock pivotally disposed on a frame segment, comprising:

a pivot section adapted to be pivotally connected to the frame segment; and a stop/rider section adjacent to one extremity of the lock and containing a rider surface adapted to slide against an adjacent frame segment of the conveyor that is nested adjacent to the frame segment to which the lock is connected, and a stop surface adapted to bear against a portion of the adjacent frame segment when the rider surface is not sliding against the adjacent frame segment.

21. A conveyor according to claim 20 in which the lock further comprises a weight section located adjacent to another extremity of the lock, which weight section is adapted to fall when the rider surface is not sliding against the adjacent frame segment, in order to pull the stop surface into place to bear against the adjacent frame segment.

* * * * *